Jan. 20, 1942.    R. R. SEARLES    2,270,663
PILLOW BLOCK
Filed Oct. 5, 1939
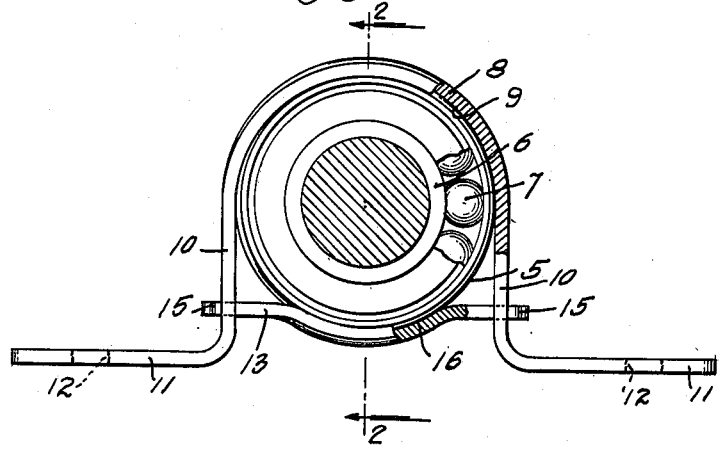
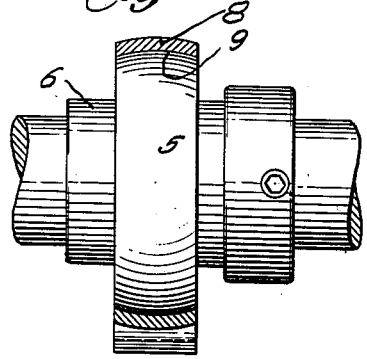
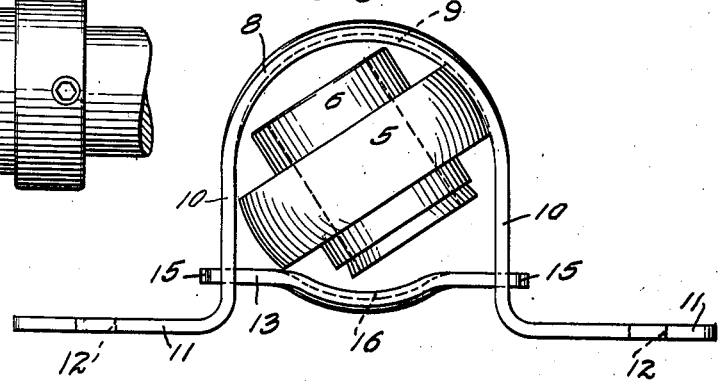
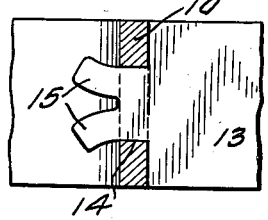
INVENTOR
RAYMOND R. SEARLES
BY
ATTORNEYS.

Patented Jan. 20, 1942

2,270,663

UNITED STATES PATENT OFFICE 2,270,663

PILLOW BLOCK

Raymond R. Searles, New Britain, Conn., assignor to The Fafnir Bearing Company, New Britain, Conn., a corporation of Connecticut Application October 5, 1939, Serial No. 298,040

2 Claims. (Cl. 308—194)

My invention relates to a self-alining bearing.

It is the object of the invention to provide an exceedingly simple and inexpensive self-alining bearing device.

Another object is to provide a self-alining bearing housing having improved means for permitting assembly of the bearing and housing.

Other objects and features of improvement will be hereinafter pointed out or will become apparent to those skilled in the art.

In the drawing which shows, for illustrative purposes only, a preferred form of the invention—

Fig. 1 is an end view in partial section and partly broken away of a self-alining bearing arrangement illustrative of the invention;

Fig. 2 is a sectional view taken substantially in the plane of the line 2—2 of Fig. 1;

Fig. 3 is an end view in elevation of the parts shown in Fig. 1, the bearing being orientated into position for assembly and disassembly; and Fig. 4 is an enlarged fragmentary view of a detail.

Briefly stated my invention in its preferred form includes a housing preferably formed of two sheet metal members rigidly secured to each other and each provided with a spherical seating surface for coaction with the spherically formed outer surface on a bearing member, such as an outer ring of an anti-friction bearing. The housing is provided with a space extending outwardly beyond the spherical surface of the bearing member and is of a width and depth sufficient to permit assembly and disassembly of the parts when the bearing member is rotated and rocked to proper position.

In the specific form shown the bearing itself includes an outer bearing ring 5 having the usual spherical surface of a self-alining bearing. The inner ring 6 is spaced from the outer ring and so held by anti-friction bearing members, such as balls 7.

The housing preferably includes a generally U-shaped sheet metal strap member 8, a part of the inside surface of which is provided with a spherical inner surface 9, to interfit with the spherical surface of the outer ring 5. In the particular form shown the spherical surface 9 is substantially semi-circular in extent. The legs 10—10 of the U-shaped strap member extend downwardly and may be bent outwardly into the form of feet 11—11 having means, such as holes 12—12, therein for receiving fastening means for attaching the entire device to a support. The bearing housing is completed by a second member, preferably of sheet metal, in the form of a tie member 13, rigidly secured to the legs 10—10. In the form illustrated the legs are apertured, as indicated at 14, and the tie member 13 is provided with tongue means 15 extending through the aperture and swedged or riveted over so as to hold the members 8—13 in rigid unitary formation. The tie member 13 at the central portion is arched downwardly, so as to provide an inner spherical surface 16, forming a continuation of the spherical surface 9 in the strap member to interfit with the spherical outer surface of the bearing ring 5.

One or both of the members comprising the housing defines a space extending outwardly beyond the spherical surface so as to permit assembly of the bearing with the housing. As illustrated the tie member 13 outwardly beyond the spherically formed portion 16 extends horizontally outwardly and the leg portions 10 extend substantially downwardly, so that the parts adjacent the junction form or define a space extending outwardly beyond the spherical surface of the housing, so that when the bearing having the spherically formed outer ring is positioned as shown in Fig. 3, it may be readily assembled with the housing and then rotated into a generally vertical position and then rocked so as to cause the spherical outer surface of the outer ring to engage the spherical surfaces in the housing and the parts will thus be held in assembled relation and yet there will be free self-alinement of the bearing in the housing.

Disassembly is, of course, effected in the reverse manner, namely, by rotating and rocking the bearing into the position shown in Fig. 3, after which the bearing may be forced outwardly due to the space heretofore mentioned.

It will be seen that I have provided an exceedingly cheap form of self-alining bearing. Substantially no machining is required. The sheet metal parts may be formed on a press and bearing surfaces secured which are sufficiently smooth and accurate to meet all requirements of a self-alining bearing of this type. The bearing may be very rapidly assembled with the housing and disassembled therefrom, and yet the bearing will be adequately supported in the housing and will permit the necessary degree and ease of self-alinement.

While the invention has been described in considerable detail and a preferred form illustrated, it is to be understood that various changes and modifications may be made within the scope of the invention as defined in the appended claims.

I claim:

1. In a self-aligning bearing, a bearing housing including a generally U-shaped strap, a tie piece extending between the legs of said U-shaped strap, said strap and said tie piece having inner bearing surfaces of generally spherical form, said bearing surface in said strap being continuous and substantially semi-circular in circumferential extent, an outer bearing ring having an outer circumferentially continuous generally spherical surface fitting said inner bearing surfaces, said strap and said tie piece being joined to each other at an angle and outwardly beyond said generally spherical surfaces, the adjacent surfaces of said strap and tie piece adjacent the point of juncture being spaced apart at the generally spherical surface of said inner ring a distance at least as great as substantially the width of said outer bearing ring.

2. In a self-aligning bearing, a bearing housing including a pair of housing members secured together, each of said housing members having a continuous circumferentially extending inner bearing surface of substantially spherical form, a bearing in said housing and including outer and inner bearing rings with interposed anti-friction bearing members, said outer bearing ring having an outer circumferentially continuous generally spherical surface to fit said inner bearing surfaces in said housing members, said housing members being joined to each other at an angle and outwardly beyond said generally spherical surfaces, said housing members being spaced from each other a distance at least as great as substantially the width of said outer bearing ring where said outer ring is engageable with said housing members adjacent the point of juncture.

RAYMOND R. SEARLES.